Aug. 14, 1956         L. S. KING         2,758,914
PURGE GAS GENERATOR WITH VORTEX TUBE COOLING
Filed Aug. 10, 1950
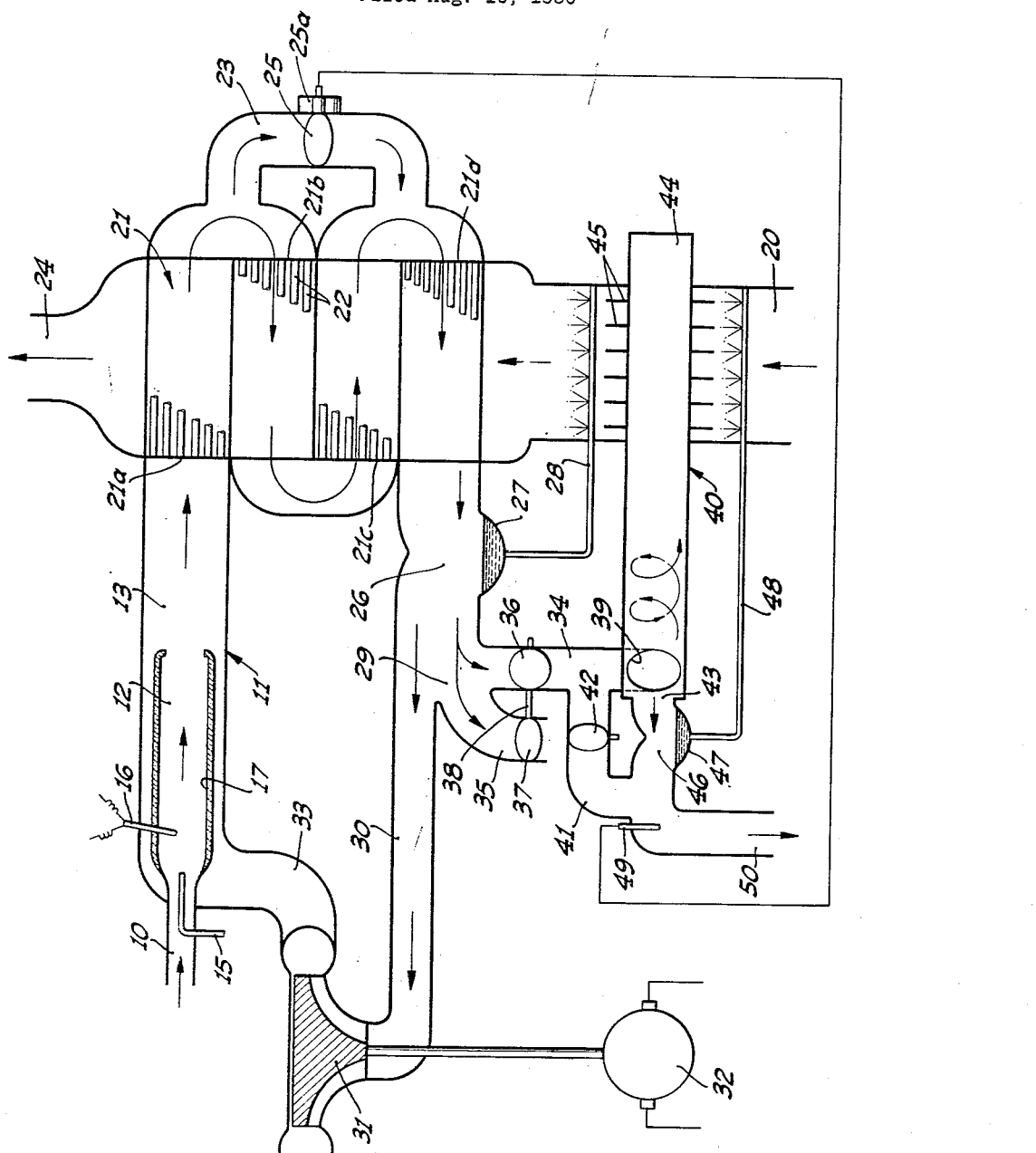
LEIGHTON S. KING,
*INVENTOR.*
BY John H. Wallace United States Patent Office 2,758,914
Patented Aug. 14, 1956

2,758,914

PURGE GAS GENERATOR WITH VORTEX TUBE COOLING

Leighton S. King, Los Angeles, Calif., assignor to The Garrett Corporation, Los Angeles, Calif., a corporation of California Application August 10, 1950, Serial No. 178,724

19 Claims. (Cl. 23—281)

This invention relates to a method for producing non-combustible gases to purge and inert spaces in general and, in particular, spaces such as the fuel tanks and fuel bays of the aircraft. It relates more particularly to a method wherein air and fuel are burned to produce the non-combustible gases and the gases are cooled by a novel combination of means including a vortex tube.

The most general object of my invention is to provide a method for purging and inerting spaces. Other general objects include the provision of a method suitable for use in aircraft for producing relatively inert gases; the provision of a method for inerting the spaces of fuel tanks and fuel bays in aircraft; the provision of a method suitable for use in aircraft for producing inert gaseous mixtures through the combustion of air and fuel; the provision of a method suitable for use in aircraft for continuously producing relatively inert gases, rendering them free of moisture, and delivering them at the proper temperature to the fuel tanks and fuel bays of aircraft; the provision of a method for producing relatively inert gases by the combustion of fuel and air at a high temperature, and cooling and drying the gases so produced to render them suitable for inerting the fuel tanks and fuel bays of aircraft; and the provision of a method suitable for use in aircraft for producing relatively inert gases by the combustion of fuel and air in a combustion chamber at a high temperature, the gas so produced being cooled and a portion of such cooled gas being recirculated to provide cooling for the combustion reaction.

My present invention has for a broad object the provision of a method whereby the above objects may be accomplished in a simple manner.

It is a dominant feature of my invention to employ vortex tube cooling means as an element of a new combination, and the effects utilized are those disclosed in United States Patent No. 1,952,281, granted March 27, 1934, to G. J. Ranque.

It is accordingly a particular object of my invention to provide a method suitable for use in aircraft for producing relatively inert gases by the combustion of fuel and air at a high temperature, which method employs vortex cooling means in combination with other means so as to accomplish the desired cooling action.

It is another object of the invention to provide a method of inerting spaces which employs vortex tube cooling means and wherein the vortex tube is provided with a single outlet.

It is another object of the invention to provide a method of inerting spaces wherein vortex tube cooling means are employed and the vortex tube is itself cooled and rendered more efficient thereby.

It is another object of the invention to provide a method of inerting spaces wherein vortex tube cooling means are employed and wherein the vortex tube is disposed in a cooling air stream and is rendered more efficient thereby.

It is another object of the invention to provide a method of inerting spaces wherein vortex tube cooling means are employed and wherein the vortex tube is itself cooled by evaporative means.

It is a further object of the invention to provide a method of inerting spaces wherein inert gases are produced by the combustion of fuel and air and are cooled by a novel combinative cooling effect of a stream of cooling air passing through a heat exchanger, the evaporation of moisture in the cooling air stream, and vortex tube cooling means.

These and other objects are effected by my invention, as will be apparent from the following description and claims taken in connection with the accompanying drawing, wherein the single figure is a schematic diagram illustrating the invention.

Referring now to the drawing there is shown a schematic diagram of one embodiment of my gas generating and inerting system. In accordance with this embodiment, compressed air from a source not shown, such as a ram or engine driven compressor, is introduced through compressed air inlet 10 into a combustion zone 11, which zone includes combustion chamber 12 and mixing chamber 13. Fuel is injected into the combustion chamber 12 through a fuel inlet 15 to form a combustible mixture with the air. The mixture is then ignited by means of an ignition plug 16 or other conventional electrical means, to cause a complete combustion between the fuel and air. With combustion, the temperature within the combustion chamber rises and it is necessary, therefore, that the burning mixture be retained inside retaining walls 17. For cooling the combustion chamber, cooled gases are recirculated to it by way of conduit 33 and pass around the outside of the flame retaining walls 17 and thence to the mixing chamber 13.

In order to permit utilization of conventional heat exchanger design the temperature of the gases must be maintained considerably below the temperature at which they leave the combustion chamber 12. Therefore, a mixing stage is provided wherein the hot gases leaving the combustion chamber 12 and passing into chamber 13 as previously indicated are mixed in the mixing chamber 13 with the recirculating cooled gases which already have passed around the outside of the flame retaining wall 17 of the combustion chamber 12. By means of this mixing, there is produced a gaseous mixture of considerably reduced temperature.

The gaseous mixture now enters a multipass heat exchanger 21 where it is further cooled by bringing it into contact with heat transfer surfaces generally designated at 22, which reject heat to a cooling fluid that in most instances in aircraft will be ram air. The ram air for cooling is drawn in the usual manner from the ambient air surrounding the aircraft. It is circulated through cooling air duct 20 where it receives moisture, passes in contact with a vortex tube 40, and then passes through the heat exchanger 21, and out the heat exchanger cooling air outlet 24, all in a manner to be more particularly explained.

As shown in the diagram, the heat exchanger 21 has four passes: 21a, 21b, 21c and 21d. It is also provided with a by-pass conduit 23 having a valve 25 operated by means of a motor 25a which is in turn controlled by the thermostat 49, located in the inert gas outlet conduit 50. This allows the heat exchanger passes 21b and 21c to be by-passed when their cooling effects are not required.

The cooled gaseous mixture leaving the heat exchanger 21 passes into the conduit 26, provided with a water trap 27 which, under the temperature and humidity conditions existing for the gaseous mixture at this point, serves to trap out a considerable amount of water. This water is then conducted through conduit 28 and into the cooling air inlet duct 20 for evaporative cooling purposes.

Following removal of water by means of the trap 27 in the conduit 26, the gaseous mixture is divided at the Y 29. A first portion is allowed to pass through conduit 30 to blower 31, driven by an electric motor 32, or other suitable prime mover. The blower 31 circulates this first portion through the recirculating conduit 33 to the combustion chamber 12 and thence to the mixing chamber 13 for the cooling and mixing purposes previously described.

A second portion divided in the Y 29 will now ordinarily pass into the conduit 34, but under certain conditions requiring gas volume control it may be dumped overboard. As shown, the valve 36 in the conduit 34 and the valve 37 in the conduit 35 are mounted on a single shaft 38, so that they may be operated together to secure the desired flow path through the conduit 34 or 35. This pair of valves may be operated manually or automatically if volume control of the purge gas becomes necessary.

Under normal conditions, the valves 36 and 37 will be in the positions shown in the drawing. Thus, the gaseous mixture will pass through conduit 34 to a tangential inlet 39 of the vortex tube 40.

As the gaseous mixture is introduced tangentially into the vortex tube 40, there is a resulting back pressure of the gaseous mixture. However, under some conditions, the pressure of the gaseous mixture may be low, due as for example, in a turbo-jet propelled aircraft, to a lowered engine compressor bleed pressure when the airplane is diving. In order that the system continue to supply purge gas to the spaces to be inerted during these times, the valve 42 may be opened by the operator or pilot. The gaseous mixture will then be by-passed around the vortex tube 40 through the conduit 41.

When the pressure of the gaseous mixture is sufficient to overcome any back pressure from the vortex tube, it enters the vortex tube tangentially. As the tube is constricted at its outlet 43, the gaseous mixture will move in a helical path towards the closed end of the tube which is herein designated as the hot end 44. Simultaneously, due to the characteristic operation of the vortex tube, a cooler core of gas is formed which moves axially in an opposite direction toward and out the tube's constricted outlet 43.

As a result of this characteristic behavior of the gaseous mixture in the vortex tube 40, the gas which is moving in a helical direction toward the hot end 44 becomes warmer by extracting heat from the gaseous core which is moving toward and out the constricted outlet 43. Therefore, the outside of the vortex tube and especially the hot end 44, becomes very hot. In order to render it more efficient, the vortex tube is itself cooled by being disposed within the cooling air duct 20 and is also provided with fins 45 to facilitate the dissipation of heat. It is also subjected to the evaporative cooling effect of a spray of water which is returned to the cooling air duct 20 in a manner to be more particularly explained.

Due to the further cooling of the gaseous mixture in the vortex tube 40, a second water removal step becomes possible. For this water removal, a second water trap 47 is located in the conduit 46, very close to the vortex tube's constriction 43. At this point, the humidity conditions are ideal for trapping out remaining moisture, and the conditions of flow and turbulence help to remove moisture as well. The moisture removed is then conducted through conduit 48 and into the cooling air duct 20 for the evaporative cooling purposes previously described.

The gaseous mixture passing through the conduit 46 contacts the thermostat 49 that controls the motor 25a for operating the valve 25 in the heat exchanger by-pass conduit 23. In this manner the temperature of the inert gaseous mixture conducted to the areas to be inerted may be controlled.

The gaseous mixture leaves through outlet conduit 50 and is delivered at a proper temperature and in a substantially dry state to the spaces to be inerted.

While there is shown and described in this application only one preferred form which the invention may assume in practice, it will be understood that this form is shown for purposes of illustration only, and that the invention may be modified and embodied in various other forms without departing from its spirit. Thus it is believed to be adaptable to any situation where a continuous supply of inert gas is required. It can be used for providing the inert storage atmospheres needed in chemical plants and refineries. It can also be used to provide inerting facilities during transportation by land or water. Due to its general applicability, other instances where it can be used are numerous.

I claim:

1. An apparatus for producing a cooled inert gas comprising: means for burning compressed air and a fuel to produce an inert gaseous mixture, and a vortex tube arranged to receive said mixture for cooling therein by imparting a vortical swirl to said mixture to thermally differentiate portions thereof, whereby a cooled portion may be delivered therefrom.

2. An apparatus for producing an inert gas according to claim 1 wherein means are provided to cool said vortex tube.

3. An apparatus for producing an inert gas comprising: means for burning compressed air and a fuel to produce a moisture laden inert gaseous mixture; means to remove said moisture from said mixture; and a plurality of cooling stages for said mixture, a vortex tube comprising one of said stages.

4. An apparatus according to claim 3 wherein said vortex tube is provided with a single outlet and means are provided to cool said vortex tube.

5. An apparatus according to claim 3 wherein said vortex tube is disposed in a cooling air stream.

6. An apparatus according to claim 3 wherein means are provided to effect evaporative cooling of said vortex tube.

7. An apparatus according to claim 3 wherein said moisture removed from said mixture is utilized for evaporative cooling of said vortex tube.

8. An apparatus according to claim 3 wherein a portion of said moisture removed from said mixture is utilized for evaporative cooling of said vortex tube.

9. An apparatus for producing an inert gaseous mixture comprising: means for burning compressed air and a fuel to produce high temperature moisture laden gaseous mixture; means to pass said moisture laden gaseous mixture through a plurality of cooling stages in heat exchange relationship to a path of coolant air; means to remove a portion of said moisture from said gaseous mixture to produce relatively dry inert gaseous mixture; means upstream from said cooling stages to introduce said moisture removed from said mixture into said path of coolant air; a vortex tube; means to introduce said relatively dry inert gaseous mixture into said vortex tube for further cooling therein; means for removing additional moisture from said further cooled inert gaseous mixture; and means to introduce said moisture from said last mentioned means for removing moisture into said path of coolant air for additional cooling of said gaseous mixture passing through said vortex tube.

10. An apparatus for producing an inert gaseous mixture comprising: means for burning compressed air and a fuel to produce a high temperature moisture laden inert gaseous mixture; a plurality of cooling stages; means to pass said moisture laden gaseous mixture through said cooling stages; a path of coolant air in heat exchange relationship to said cooling stages; means to remove a portion of said moisture to produce a relatively dry inert gaseous mixture; means upstream from said cooling stages to introduce said moisture into said path of coolant air; means to divide said relatively dry inert gaseous mixture into a plurality of portions; means to conduct one of said portions of said mixture for mixing with said high temperature moisture laden inert gaseous mixture; a vortex tube; means to introduce another portion of said relatively dry inert gaseous mixture into said vortex tube for further cooling therein; means for removing moisture from said further cooled inert gaseous mixture; and means to introduce said moisture from said last mentioned means for removing moisture into said path of coolant air for additional cooling of said gaseous mixture passing through said vortex tube.

11. An apparatus for producing an inert gaseous mixture comprising: a combustion chamber for burning a compressed air and a fuel to produce a high temperature moisture laden gaseous mixture; a heat exchanger having a plurality of cooling stages; means to conduct said moisture laden gaseous mixture through said cooling stages; passage means for conducting coolant air in heat exchange relationship to said cooling stages; a moisture trap positioned immediately downstream from the last stage of said heat exchanger for removing a portion of said moisture from said gaseous mixture to produce a relatively dry gaseous mixture; means to deliver said moisture removed by said moisture trap into said passage means immediately upstream from said cooling stages for use as an evaporative coolant in said stages; means immediately downstream from said moisture trap to divide the flow of said gaseous mixture into a plurality of portions; means to conduct one of said portions about said combustion chamber and to mix said portion with said high temperature moisture laden gaseous mixture; a vortex tube having a portion positioned in heat exchange relationship to said coolant path in said passage means; means to deliver another portion of said relatively dry gaseous mixture to said vortex tube for additional cooling therein; means immediately downstream from said vortex tube for removing additional moisture from said gaseous mixture; and means to deliver said additional moisture removed from said gaseous mixture to said passage means immediately upstream from said portion of said vortex tube positioned therein for use as an evaporative coolant about said vortex tube.

12. An apparatus according to claim 11 wherein by-pass means are provided about at least one of said cooling stages of said heat exchanger; and thermostat means for controlling the flow of said gaseous mixture through said by-pass.

13. An apparatus according to claim 11 wherein means are provided to by-pass said another portion of said relatively dry gaseous mixture about said vortex tube and said last mentioned means for removing moisture.

14. An apparatus according to claim 11 wherein means are provided to propel said relatively dry gaseous mixture through said means for conducting said one portion of said gaseous mixture to said combustion chamber.

15. An apparatus for producing a dry inert gaseous mixture according to claim 11 wherein by-pass means is provided about at least one of said cooling stages of said heat exchanger; thermostat means is provided for controlling the flow of said gaseous mixture through said by-pass; and means is provided to by-pass another portion of said mixture about said vortex tube and said last mentioned means for removing moisture.

16. An apparatus for producing an inert gaseous mixture comprising: a combustion chamber for burning compressed air and a fuel; conduit means interconnecting said combustion chamber and a multi-stage heat exchanger having a coolant air passage; means immediately downstream from said heat exchanger removing moisture from said mixture; a vortex tube positioned downstream from said means for removing moisture for further cooling said mixture; and means positioned immediately downstream from said vortex tube for removing additional moisture from said mixture.

17. An apparatus for producing an inert gaseous mixture according to claim 16 wherein means are provided immediately upstream from said vortex tube to divide the discharge from said first mentioned means for removing moisture and to conduct a portion of said mixture over said combustion chamber for thereafter mixing with the combustion chamber discharge in the conduit means interconnecting said combustion chamber and said heat exchanger.

18. An apparatus for producing an inert gaseous mixture according to claim 16 wherein the temperature of the gaseous mixture leaving said last mentioned means for removing moisture is controlled by a thermostat, said thermostat being adapted to control the flow of the mixture through a conduit by-passing at least one of the cooling stages of said heat exchanger.

19. An apparatus for producing an inert gaseous mixture according to claim 16 wherein the moisture removed from the mixture is utilized for evaporative cooling of one portion of said vortex tube and is further utilized for evaporative cooling in said heat exchanger.

References Cited in the file of this patent

UNITED STATES PATENTS

| | | |
|---|---|---|
| 716,381 | Clayton | Dec. 23, 1902 |
| 1,952,281 | Rangue | Mar. 27, 1934 |
| 1,953,120 | Miller | Apr. 3, 1934 |
| 1,984,665 | Tone | Dec. 18, 1934 |
| 2,051,125 | Bacon | Aug. 18, 1936 |
| 2,093,379 | Willenborg | Sept. 14, 1937 |
| 2,522,787 | Hughes | Sept. 19, 1950 |
| 2,583,921 | Yellot | Jan. 29, 1952 |